US008597527B2

(12) United States Patent
Taniguchi

(10) Patent No.: US 8,597,527 B2
(45) Date of Patent: Dec. 3, 2013

(54) METHOD FOR FORMING A CONCAVO-CONVEX PATTERN AND A METHOD OF MANUFACTURING A PATTERNED MEDIUM TYPE MAGNETIC RECORDING MEDIUM

(75) Inventor: Katsumi Taniguchi, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 478 days.

(21) Appl. No.: 12/548,058

(22) Filed: Aug. 26, 2009

(65) Prior Publication Data
US 2010/0084372 A1 Apr. 8, 2010

(30) Foreign Application Priority Data

Aug. 26, 2008 (JP) ................. 2008-216940

(51) Int. Cl.
*B44C 1/22* (2006.01)
(52) U.S. Cl.
USPC .......... 216/22; 216/63; 216/75; 216/78; 438/706; 438/710; 438/712

(58) Field of Classification Search
None
See application file for complete search history.

(56) References Cited

U.S. PATENT DOCUMENTS

| 2001/0004797 | A1* | 6/2001 | Hsiao | 29/603.07 |
| 2003/0181056 | A1* | 9/2003 | Kumar et al. | 438/710 |
| 2003/0219984 | A1* | 11/2003 | Ying et al. | 438/709 |
| 2005/0016957 | A1 | 1/2005 | Kodaira et al. | |

FOREIGN PATENT DOCUMENTS

| JP | 2005-042143 | A | 2/2005 | | |
| JP | 2005-056547 | | 3/2005 | | |
| JP | 2005-314791 | | * 11/2005 | ................ | C23F 4/00 |
| JP | 2005-314791 | A | 11/2005 | | |
| JP | 2006-031849 | A | 2/2006 | | |

OTHER PUBLICATIONS

K.B. Jung et al., Journal of Electronic Materials vol. 26, No. 11, 1997, pp. 1310-1313.*
Office Action issued Jan. 24, 2012 for corresponding JP2008-216940 (Partial English Translation Provided).

* cited by examiner

*Primary Examiner* — Lan Vinh
*Assistant Examiner* — Jiong-Ping Lu
(74) *Attorney, Agent, or Firm* — Rossi, Kimms & McDowell LLP

(57) ABSTRACT

The invention provides a method of forming a concavo-convex pattern by partly removing a magnetic layer and a carbon protective layer in an intermediate product of a magnetic recording medium having at least the magnetic layer and the protective layer formed on a substrate surface, wherein the magnetic layer is partly removed to form the concavo-convex pattern by a dry etching method using a etching gas of a mixture gas of argon and a deposition gas containing one or more types of carbon compounds. Also disclosed is a method of manufacturing a patterned medium type magnetic recording medium employing the method of forming a concavo-convex pattern. As a result a concavo-convex pattern free of after-corrosion and exhibiting good productivity is provided.

5 Claims, 4 Drawing Sheets ratio of flow rate of CH4 gas to flow rate of Ar gas

METHOD FOR FORMING A CONCAVO-CONVEX PATTERN AND A METHOD OF MANUFACTURING A PATTERNED MEDIUM TYPE MAGNETIC RECORDING MEDIUM

BACKGROUND OF THE INVENTION

The present invention relates to a method of forming a concavo-convex pattern in a patterned medium type magnetic recording medium, and a method of manufacturing a patterned medium type magnetic recording medium.

The recording density of magnetic recording media such as hard disks has been increased by various measures including change of the materials composing the disks, reduction of particle size in the magnetic recording layer, miniaturization of a magnetic head, and employment of perpendicular magnetic recording system. Nevertheless, the recording density enhancement is approaching the limit of current technologies.

In order to further increase the recording density, magnetic recording media of a patterned medium type has been proposed, which can be a discrete track type or a bit pattern type, both of which form a fine concavo-convex pattern in the magnetic recording layer.

In one of the methods for manufacturing a patterned medium type magnetic recording medium, a resin material of UV curing (ultra violet light curing), thermoplastic, or thermosetting type is applied on the protective layer and a concavo-convex pattern is formed on the resin material by means of nano-imprint molding. A method of forming the pattern is also implemented by using a photo-resist of a UV curing type resin material and patterning through laser drawing or photomask exposure.

FIGS. 2(a) through 2(e) show an outline process of forming a concavo-convex pattern in a patterned medium type magnetic recording medium. FIG. 2(a) shows a stage in which a resin mask layer 16 made of the above-mentioned resin is formed on a protective layer 15 in a magnetic recording medium comprising a soft magnetic layer 11, a seed layer 12, an intermediate layer 13, a magnetic layer 14, and a protective layer 15 formed in this order on a substrate 10. FIG. 2(b) shows a stage in which a concavo-convex structure is formed on the resin mask layer 16 by nano-imprinting molding. FIG. 2(c) shows a stage in which a resist pattern of the resin material is formed by removing the thinner places of the resin mask layer 16 by means of a reactive etching method. Then, the magnetic layer and the protective layer at the exposed places of the magnetic recording medium having a resist pattern of the resin material are removed by means of a reactive etching method, for example. FIG. 2(d) shows a stage in which the magnetic layer and the protective layer at the exposed places of the magnetic recording medium have been removed. Finally, the resin mask layer 16 is removed by exposing to plasma, for example, to complete formation of a concavo-convex pattern in a patterned medium type magnetic recording medium. FIG. 2(e) shows a stage in which formation of the concavo-convex pattern is completed.

The magnetic layer is often composed of a hard to etch material such as cobalt or chromium and etched in a slower etching rate than the resin mask. As a result, etching work may be difficult in forming a resist pattern by a resin mask only. In that case, a hard mask layer exhibiting a lower etching rate than the magnetic layer is formed on the protective layer using titanium, tantalum, or oxide or nitride of those elements, and the concavo-convex pattern is formed in the hard mask layer using the resin mask by means of an ion beam etching method or a reactive ion etching method. Provided the etching rate on the hard mask is sufficiently low in the process of working on the magnetic layer, the hard mask layer can be thin and worked using the resin mask.

FIGS. 3(a) through 3(g) show schematically a process of forming a concavo-convex pattern using a hard mask layer. FIG. 3(a) shows a stage in which a hard mask layer 19 and a resin mask layer 16 formed thereon are formed on a protective layer 15 of a magnetic recording medium similar to the one shown in FIG. 2(a). FIG. 3(b) shows a stage in which a concavo-convex structure is formed in the resin mask 16. FIG. 3(c) shows a stage in which a resist pattern of the resin material is formed by removing the thinner places of the resin mask layer 16 by means of a reactive etching method, for example. FIG. 3(d) shows a stage in which a concavo-convex pattern is formed in the hard mask layer by means of ion beam etching or reactive ion etching. After working on the hard mask layer 19, the resin mask layer 16 is removed by reactive etching technique such as oxygen plasma, ozone plasma or the like. In the case the protective layer 15 is composed of a carbon material such as DLC (diamond like carbon), the protective layer at the places of etched hard mask layer (exposed protective layer places) is processed simultaneously with the resin mask layer through the reactive etching with oxygen plasma or ozone plasma for removing the resin mask layer. FIG. 3(e) shows a stage in which the resin mask layer 16 and the exposed places of the protective layer 15 have been removed. After removing the resin mask layer, the magnetic layer is processed to a concavo-convex structure using a mask of the hard mask layer by means of an ion beam etching method or a reactive ion etching method. Finally, the hard mask layer is removed using a reactive gas exhibiting a low etching rate on the magnetic layer. Thus, a concavo-convex pattern is formed on a patterned medium type magnetic recording medium. FIG. 3(f) shows a stage in which the magnetic layer has been processed into a concavo-convex structure, and FIG. 3(g) shows a stage in which the hard mask layer is removed.

Japanese Unexamined Patent Application Publication No. 2005-056547 discloses a starting article for processing a magnetic recording medium, the article comprising a first mask layer composed of TiN (corresponding to the hard mask layer in the above description) and a second mask layer composed of nickel. Nickel is apt to be etched more easily than cobalt or chromium, which composes the magnetic layer, and functions similarly to the resin mask described above although nickel is an inorganic material and the resin material is an organic material. A resist layer is formed on the second mask layer and after patterning the resist layer, the second mask layer is patterned by ion beam etching, and the first mask layer is patterned by reactive etching using a reactive gas of oxygen. After that, the magnetic layer is patterned by ion beam etching.

In methods of manufacturing a patterned medium type magnetic recording medium based on the conventional technologies, argon gas is commonly used in the ion beam etching for processing the magnetic layer. This ion beam etching is executed by physical etching through collision of argon ions or atoms on the material to be etched. Consequently, degenerated layer due to chemical reaction does not remain and performance degradation in the magnetic layer at the unetched portion scarcely occurs. As for the depth of the processing, however, it is commonly thought that the aspect ratio (depth/width) is about one and striving for minute pattern has its limitation. When the mask layer for the processing is thick, a workable depth further decreases causing difficulty in forming a concavo-convex structure in a fine pattern.

In the case a reactive ion etching method is used for processing the magnetic layer, known etching gases include chlorine-containing gas and a mixture gas of CO and $NH_3$ for etching the metallic material of cobalt, chromium or the like composing the magnetic layer, which are hard to etch. In Japanese Unexamined Patent Application Publication No. 2005-056547, the mixture gas of CO and $NH_3$ is also used for an etching gas.

The chlorine-containing gas used in the etching process forms a chloride with the metals of cobalt and chromium. The chloride vaporizes or is physically removed through collision of ions as progress is made through the working process. In the process, the ions hardly collide with the side walls of the parts being worked and the etching progresses selectively in the perpendicular direction. As a result, the chlorine or chlorides remains on the side walls causing a problem of after-corrosion.

The mixture gas of CO and $NH_3$ forms a carbonyl compound with cobalt and chromium. This compound exhibits a low evaporation temperature and low vapor pressure. As a result, the etching can progress without physical assist such as collision of ions. However, the CO is a gas of strong toxicity and is difficult to handle, and thus is unsuited for industrial production.

SUMMARY OF THE INVENTION

The present invention has been made in view of the circumstances described above, and the invention provides a method of forming a concavo-convex pattern free of after-corrosion and exhibiting good productivity in a process of manufacturing a patterned medium type magnetic recording medium. The invention also provides a method of manufacturing a patterned medium type magnetic recording medium using such a method of forming a concavo-convex pattern.

Specifically, a method of forming a concavo-convex pattern according to the invention forms a concavo-convex pattern in an intermediate product of a magnetic recording medium having at least a magnetic layer and a carbon protective layer formed on a substrate surface by processing the magnetic layer and the protective layer, wherein the concavo-convex pattern is formed by processing the magnetic layer through dry etching using an etching gases of a mixture gas of argon and a deposition gas containing a carbon compound(s).

A method of manufacturing a patterned medium type magnetic recording medium according to the invention comprises a step of preparing an intermediate product of a magnetic recording medium having at least a magnetic layer and a carbon protective layer, and a step of forming a concavo-convex pattern by partially removing the carbon protective layer and the magnetic layer of the intermediate product of the magnetic recording medium using a mask having a predetermined pattern, wherein the step of forming a concavo-convex pattern consists of a sub-step of partially removing the carbon protective layer and a sub-step of partially removing the magnetic layer, the latter sub-step conducts dry etching process using an etching gas of a mixture gas of argon and a deposition gas containing a carbon compound(s).

The method of the invention manufactures a patterned medium type magnetic recording medium including at least a magnetic recording layer that is a magnetic domain-aligned magnetic layer and a carbon protective layer, the both layers being formed on a substrate surface, and comprises a step of forming a concavo-convex pattern by working on the magnetic layer and the protective layer. In the step, a resin mask layer is first formed for concavo-convex pattern processing, by means of imprinting on or an electron beam exposure to a resin material of a UV curing type, a thermoplastic type or a thermosetting type.

This resin mask layer is used for processing on the protective layer by means of a reactive ion etching device to expose places of the surface of the magnetic layer to be worked. The processing on the protective layer uses oxygen gas so as to efficiently etching the carbon of the protective layer. In this process, however, the resin mask layer is also etched leaving a very thin resin mask layer.

Then, a concavo-convex pattern is formed by working on the exposed places of the magnetic layer surface. This working process uses an etching gas of argon, which physically works by argon ions on the magnetic layer of hard-to-work material. The working process by the argon ions, however, exhibits a fast processing rate on the resin mask layer and has a fear that the resin mask layer may disappear before the working on the magnetic layer reaches the depth necessary for forming the concavo-convex pattern. Accordingly, a deposition gas is added that contains at least one carbon compound selected from the group consisting of a hydrocarbon compound, a carbon chloride compound, and a fluorine-containing hydrocarbon compound in order to decrease a working rate on the carbon protective layer when the resin mask layer is eliminated and the protective layer is exposed.

The deposition gas tends to adhere on the surface of the carbon protective layer, and the carbon protective layer functions as a mask layer in the processing work on the magnetic layer. Since excessive addition of the deposition gas results in too much adhesion of the gas to the surface of the magnetic layer to be worked and decreases the working rate of the magnetic layer, the ratio of the flow rates of the argon gas and the deposition gas is optimized. Thus, the thickness of the carbon protective layer remains at the initial value so that the working process progresses only on the magnetic layer.

Owing to the dry etching using the mixture gas of argon gas and the deposition gas, a working process on the magnetic layer is carried out without after-corrosion and in high productivity.

Therefore, the invention provides a method of manufacturing a patterned medium type magnetic recording medium in high productivity without after-corrosion due to remainder of chloride after working process on the magnetic layer in the concavo-convex pattern without using a gas of strong toxicity such as CO.

BRIEF DESCRIPTION OF THE DRAWINGS

The invention will be described with reference to certain preferred embodiments and the accompanying drawings, wherein.

DETAILED DESCRIPTION OF THE INVENTION PREFERRED EMBODIMENTS

Figure 1A:
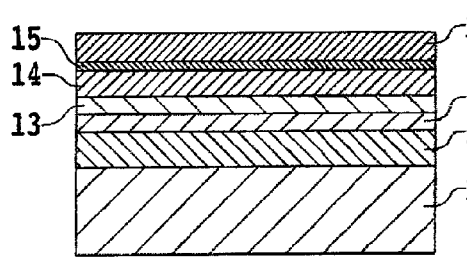
FIGS. 1(a) through 1(h) are schematic sectional views showing an embodiment of a step of forming a concavo-convex pattern according to the invention.

An intermediate product of a magnetic recording medium on which a concavo-convex pattern is formed in the present invention is formed with at least a magnetic layer and a carbon protective layer on a substrate surface. An example of such an intermediate product of a magnetic recording medium has a soft magnetic layer 11, a seed layer 12, an intermediate layer 13, a magnetic layer 14, and a carbon protective layer 15 formed in this order on a substrate 10 as shown in FIG. 1(a). A resin mask layer 16 is formed on the protective layer 15 in this intermediate product of a magnetic recording medium.

The substrate 10 is favorably nonmagnetic and can be composed of any material conventionally used in manufacturing a magnetic recording medium. A useful substrate can be produced using a material such as glass, NiP-plated aluminum alloy, or silicon, for example.

The soft magnetic layer 11 is composed of a soft magnetic material containing at least one of cobalt, nickel and iron. Useful materials for forming the soft magnetic layer include crystalline materials such as FeTaC and a sendust alloy (FeSiAl); microcrystalline materials such as FeTaC, CoFeNi, and CoNiP; and amorphous materials such as cobalt alloys of CoZrNd, CoZrNb, and CoTaZr. The soft magnetic layer functions to concentrate a perpendicular magnetic field generated by a magnetic head into the magnetic recording layer in a perpendicular magnetic recording medium. A thickness of the soft magnetic layer is preferably in the range of 5 to 100 nm in balance with productivity although the optimum value changes depending on the structure and characteristics of the magnetic head used for recording.

The seed layer 12 is a crystalline layer for controlling crystal orientation of the intermediate layer 13 made of ruthenium or the like. The seed layer can be formed of: a permalloy material such as NiFeAl, NiFeSi, NiFeNb, NiFeB, NiFeNbB, NiFeMo, and NiFeCr; a permalloy material with an additive of cobalt such as CoNiFe, CoNiFeSi, CoNiFeB, and CoNiFeNb; cobalt; and cobalt-based alloys such as CoB, CoSi, CoNi, and CoFe. The seed layer has preferably a thickness sufficient to control a crystal structure of the magnetic recording layer and, in ordinary cases, is deposited to a thickness at most 10 nm by means of a sputtering method.

The intermediate layer 13 controls magnetic domain orientation in the magnetic recording layer. The crystal orientation of the intermediate layer is controlled by the seed layer 12. The intermediate layer 13 can be composed of ruthenium or an alloy mainly composed of ruthenium. The intermediate layer 13 has a thickness in the range of 1 to 10 nm and deposited by a sputtering method. A thickness in this range gives characteristics required for high density recording to the magnetic recording layer without degradation in magnetic performance and electromagnetic conversion performance of the magnetic recording layer.

The magnetic layer 14 is a magnetic recording layer with magnetic domain orientation and can be formed of a ferromagnetic material of an alloy containing at least cobalt and platinum. An axis of easy magnetization of the ferromagnetic material is necessarily oriented in the direction of magnetic recording. For perpendicular magnetic recording, for example, the axis of easy magnetization (c-axis of the hexagonal closest packed (hcp) structure) of the magnetic recording layer is necessarily oriented perpendicularly to the surface of the recording medium (the principal plane of the substrate). The magnetic recording layer can be formed of an alloy material of CoPt, CoCrPt, CoCrPtB, or CoCrPtTa, for example. A thickness of the magnetic recording layer is not limited to a special value; but, ordinarily in the range of 5 to 50 nm in view of productivity and improvement in recording density and deposited by means of a sputtering method.

The protective layer 15 is a layer of a main component of carbon such as DLC with a thickness of at most 10 nm and deposited by means of a CVD (chemical vapor deposition) method or the like.

The resin mask layer 16 is formed of a resin material or SOG applied on the protective layer 15 and has a thickness in the range of 30 to 100 nm. The resin material can be a resin material of UV curing resin, thermoplastic resin, thermosetting resin or the like composed mainly of acrylic resin. The resin mask layer 16 can be formed by a spin-coating method or a spray-coating method.

On this mask layer 16, a predetermined concavo-convex pattern is formed. (FIG. 1(b)) The concavo-convex pattern can be formed by nano-imprint molding. When the mask layer 16 is formed of a UV curing type resin, the concavo-convex pattern is alternatively formed by laser drawing or photo-mask exposure.

The concavo-convex pattern in a patterned media can be discrete track type pattern in which the concavo-convex pattern is formed along the track, or the concavo-convex pattern can be a bit pattern type pattern.

When the concavo-convex pattern is formed in the mask material by nano-imprint molding, a thickness of application of the mask material needs to be changed corresponding to the height of the concavo-convex pattern of the mold in the nano-imprinting, and the optimum height of the concavo-convex pattern is about ±10 nm.

Then, resin remaining resin at the recessed places in the mask layer 16 is removed by an ion bean etching method using an inert gas of argon, helium, neon or the like, or a reactive ion etching method using a reactive gas.

When an ion bean etching method is employed, an angle of the substrate is preferably in the range of 0° to 70° with respect to the plane perpendicular to the incident ion beam.

Then, using a mask of the resin mask layer, the exposed places of the carbon protective layer 15 are removed in a reactive ion etching device. Etching gas can be oxygen gas, for example.

Figure 1E:
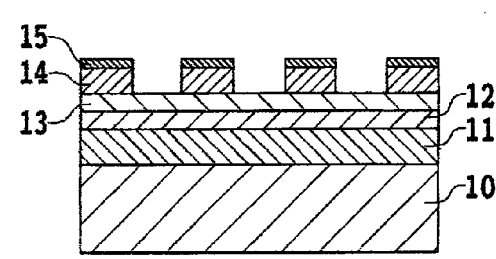
Figure 1B:
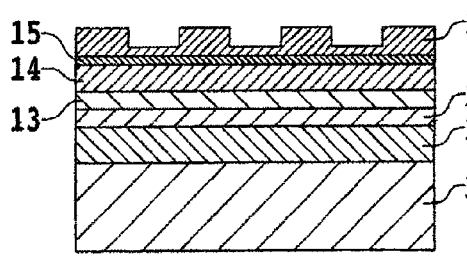
Figure 1F:
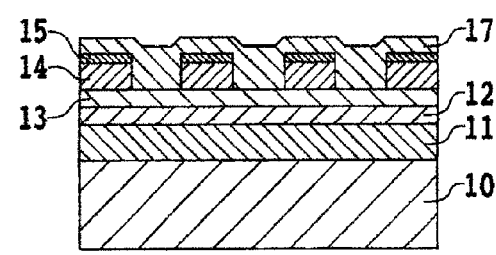
Figure 1C:
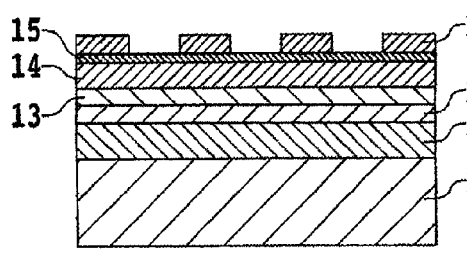
Figure 1G:
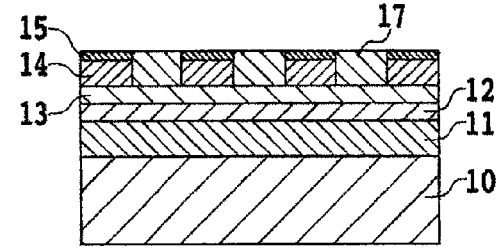
Figure 1D:
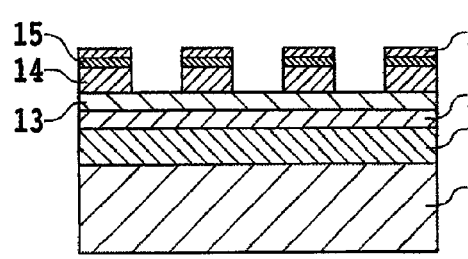
Figure 1H:
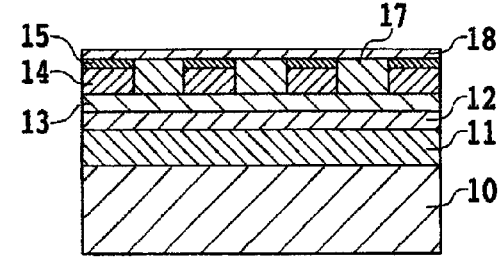
Figure 2A:
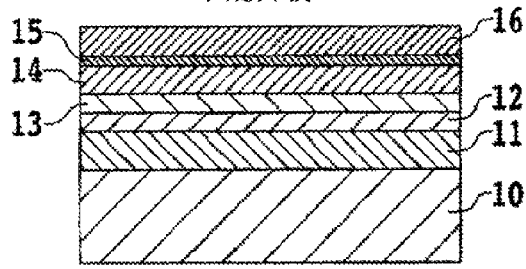
FIGS. 2(a) through 2(e) are schematic sectional views showing a step of forming a concavo-convex pattern using a resin mask layer for working process in the step in a conventional patterned medium type magnetic recording medium.
Figure 2D:
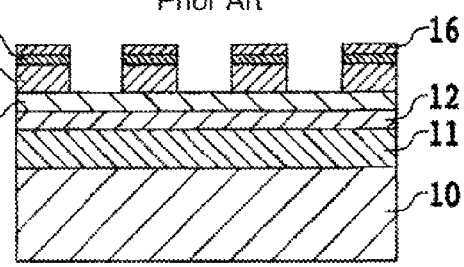
Figure 2B:
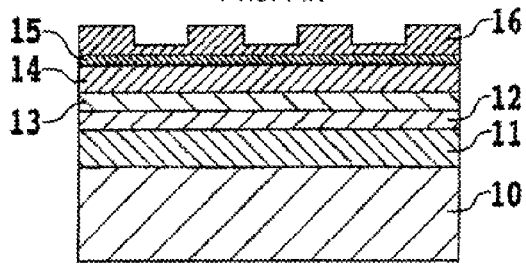
Figure 2E:
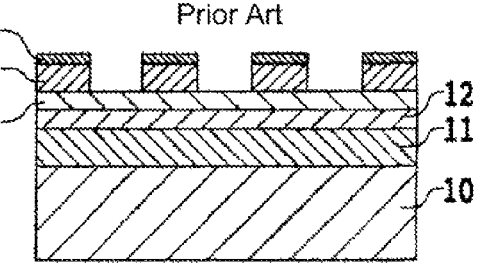
Figure 2C:
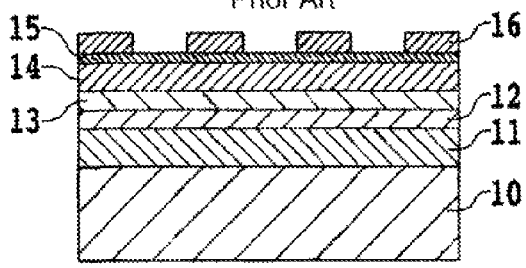
Figure 3A:
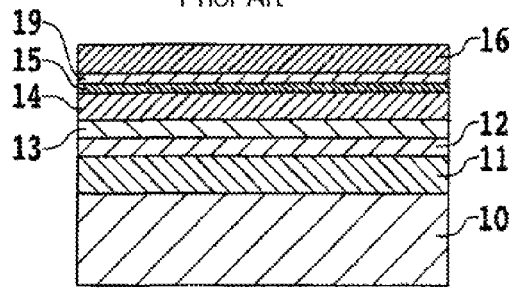
FIGS. 3(a) through 3(g) are schematic sectional views showing a step of forming a concavo-convex pattern using a hard mask layer for working process in the step in a conventional patterned medium type magnetic recording medium.
Figure 3E:
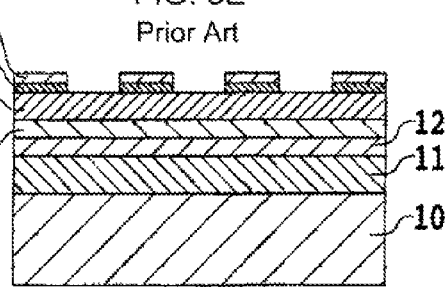
Figure 3B:
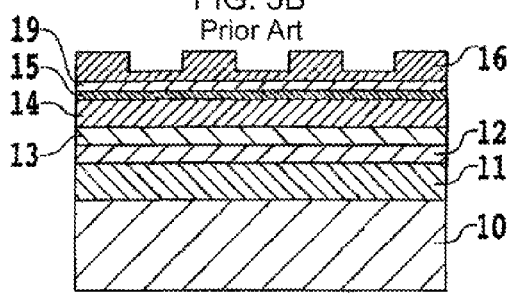
Figure 3F:
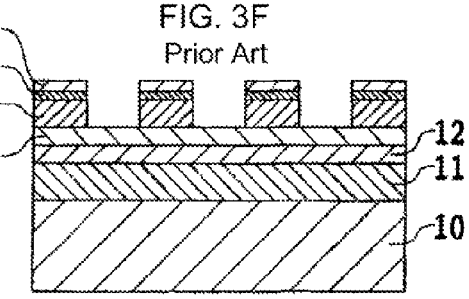
Figure 3C:
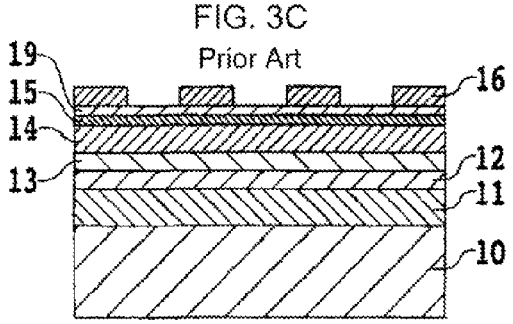
Figure 3G:
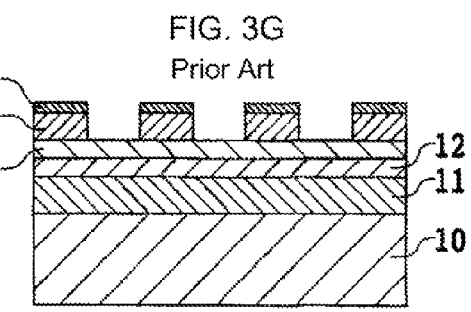
Figure 3D:
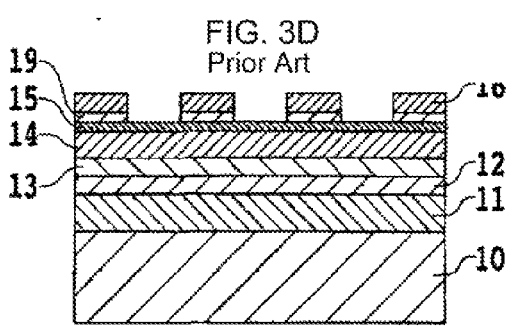

Then, leaving the resin mask layer 16 as it remains, the exposed places of the magnetic layer 14 are removed (FIG. 1(d)). The etching gas is a mixture gas of argon gas and a deposition gas containing at least one of carbon compounds of a hydrocarbon compound (CxHy system), a carbon fluoride compound (CxFy system), and fluorine-containing hydrocarbon compound (CxHyFz system).

Figure 4:
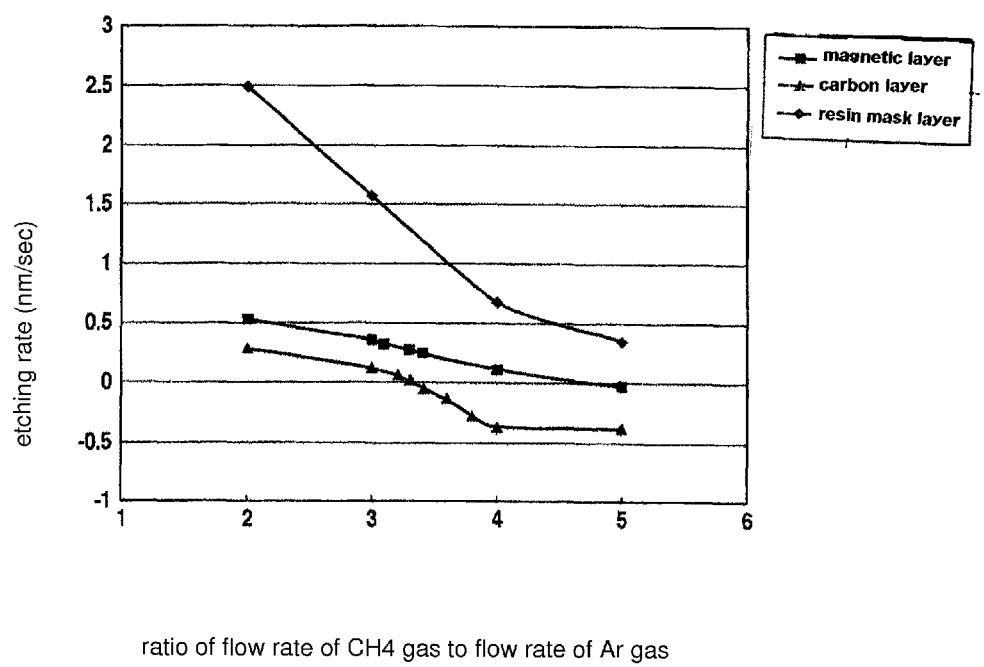
FIG. 4 is a graph showing variation of etching rates in the magnetic layer, the carbon layer, and the resin mask layer in response to variation of the mixing ratio in the mixture gas of argon gas and the carbon-containing deposition gas that is $CH_4$ gas, in the working process on the magnetic layer according to the invention.

FIG. 4 shows data of etching rate variation of the magnetic layer, carbon layer, and the resin mask layer corresponding to variation of the mixing ratio of argon gas and the deposition gas, which was $CH_4$. More specifically, argon gas flow rate was a constant value of 5 sccm and the $CH_4$ gas flow was changed. The etching pressure was 0.1 Pa and the antenna power and the bias power to the substrate were 600 W and 300 W, respectively for the data of FIG. 4. With increase of the flow rate of the $CH_4$ gas, the etching rate decreases and deposition occurs in the carbon layer. In addition to the fact that the etching rate in the carbon layer is low, it can be considered that the carbon compound in the plasma decomposes to generate carbon which effectively bonds with the carbon in the carbon mask layer. Owing to this effect, the magnetic layer is processed with scarcely etching the carbon mask layer.

More precisely, in the course of increasing the proportion of $CH_4$ gas, the etching rate of the carbon layer becomes zero at a flow rate ratio of $CH_4$ gas of 3.3. From this point to the flow rate ratio of $CH_4$ gas of 4.5, the deposition to the carbon layer occurs on the one hand, and the etching of the magnetic layer and the resin mask layer are performed on the other hand.

Accordingly, the ratio of the $CH_4$ gas flow is preferably in the range of 2.0 to 3.5 where the etching rate for the magnetic layer is relatively high and the etching rate for the carbon layer is around zero. The ratio is more preferably in the range of 3.0 to 3.5 and most preferably in the range of 3.2 to 3.4.

When the $CH_4$ gas is used for a deposition gas under favorable conditions, the carbon generated by decomposition in the plasma and deposited to the carbon layer is in a bonding state almost same as that in a DLC film formed by a CVD method. Therefore, the carbon layer can be utilized as a protective layer.

Although FIG. 4 shows an example using $CH_4$ gas, the same effect is exhibited using a hydrocarbon compound (CxHy system), a carbon fluoride compound (CxFy system), and fluorine-containing hydrocarbon compound (CxHyFz system).

Further, nitrogen, hydrogen or a rare gas(es) other than argon can also be added to the mixture of the argon gas and the carbon compound-containing deposition gas.

When the removal of the exposed places of the magnetic layer 14 progresses using a mixture gas containing at least one of the carbon compounds of a hydrocarbon compound (CxHy system), a carbon fluoride compound (CxFy system), and fluorine-containing hydrocarbon compound (CxHyFz system), the convex parts of the resin mask layer 16 are also etched and removed. If the resin mask layer 16 disappears, the carbon layer 15 functions as a mask, and the exposed places of the magnetic layer 14 continue to be etched. FIG. 1(e) shows a state when the etching is finished.

In the subsequent step, a nonmagnetic material 17 is deposited to a thickness in the range of 20 to 100 nm to fill the concaved (recessed) places. An example of the nonmagnetic material 17 is $SiO_2$, which can be deposited by sputtering or PCVD (plasma CVD).

Through the deposition process, the nonmagnetic material 17 fills the concaved (recessed) places and is deposited also on the convex (protruding) places, too, as shown in FIG. 1(f).

Then, the nonmagnetic material over the embedded magnetic layer 14 and the protective layer 15 is removed by polishing or etching-back by means of ion beam etching under an inert gas atmosphere to expose the protective layer and planarize the surface. FIG. 1(g) shows the planarized state.

Finally, a protective layer 18 of a carbon material of DLC, for example, is deposited by a CVD method. On the resulted article, carbon is deposited by sputtering.

The total thickness including the carbon layer remained after the working process on the magnetic layer affects the spacing between the substrate and the read-write head. The total thickness of layers of carbon can be controlled to avoid an excessively large spacing by controlling the remained carbon layer through adjustment of the gas flow ratio in the working process on the magnetic layer.

Through the above-described steps, a patterned medium type magnetic recording medium can be manufactured without after-corrosion and with high productivity.

The present invention will be described more in detail referring to an example of a preferred embodiment. In this example, glass was used for the substrate 10, on which a soft magnetic layer 11 with a thickness of 45 nm was formed of CoZrNb. Then, a crystalline seed layer 12 having a thickness of 5 nm was formed of CoNiFeSi on the soft magnetic layer 11 to control crystal orientation of an intermediate layer 13 of ruthenium. Subsequently, the intermediate layer 13 composed of ruthenium was deposited to a thickness of 10 nm by a sputtering method. After that, a perpendicular magnetic recording layer (a magnetic layer) 14 was formed by forming a granular layer 8 nm thick composed of $CoCrPt-SiO_2$, forming a ruthenium layer 0.2 nm thick thereon, and forming a CoCrPtB layer 8 nm thick thereon. On the magnetic layer, a carbon protective layer 15 was formed of a DLC film 3.5 nm thick by a CVD method. Then, a thermosetting resin material was applied in a thickness of 30 nm by a spin-coating method and a concavo-convex pattern was formed on the resin material by nano-imprint molding. The thickness of the coating resin material needs to be changed according to the height of the concavo-convex pattern of the nano-imprint mold, and the height of the concavo-convex pattern was about ±10 nm. The places of thinner film of the concavo-convex pattern of the resin material were removed by reactive etching to obtain a resist pattern.

This resist pattern was a pattern of a discrete track medium type having a concavo-convex parts aligned along the track direction. The pattern pitch was 60 nm and the height of the protruding parts was 30 nm.

Then, the exposed parts of the carbon protective layer 15 were removed using a resin mask layer 16 of the resin material having this resist pattern by means of a reactive ion etching device. The etching gas used was oxygen gas at a flow rate of 10 sccm under the etching pressure of 0.1 Pa. The antenna power for generating plasma was 200 W and the bias power was 100 W in the process of removing the exposed parts of the carbon layer. The ratio of working rate on the carbon layer to the working rate on the resin mask layer was from 1:2 to 1:5, and the height of the protruding parts of the resin mask layer 16 needed 5 times or more of the carbon layer thickness.

Leaving the remaining resin mask layer 16, the exposed parts of the magnetic layer 14 were removed. The etching gas used was a mixture gas of argon at a flow rate of 5 sccm and methane gas at a flow rate of 16.5 sccm (methane flow rate ratio of 3.3). The etching pressure was 0.1 Pa, and the antenna power and the bias power on the substrate were 600 W and 300 W, respectively. This etching process etched solely the magnetic layer 14 while scarcely etching the carbon mask layer 15.

Further, a nonmagnetic material 17 of $SiO_2$ was deposited to a thickness of 20 nm by sputtering to fill the recessed parts.

Then, the nonmagnetic material 17 over the protruding parts was removed by argon ion beam etching to expose the protective layer 15 and obtain a flat surface.

Finally, a carbon film of DLC for a protective layer 18 was deposited to a thickness of 2 nm by a CVD method, and additional carbon 0.5 nm thick was deposited thereon by a sputtering method. Thus, a patterned medium type magnetic recording medium was obtained. The thus obtained patterned medium type magnetic recording medium was free of after-corrosion.

The invention has been described with reference to certain preferred embodiments thereof. It will be understood, however, that modifications and variations are possible within the scope of the appended claims.

This application is based on, and claims priority to, Japanese Patent Application No. 2008-216940, filed on Aug. 26, 2008 contents of which are incorporated herein by reference.

What is claimed is:

1. A method of forming a concavo-convex pattern by partly removing a magnetic layer and a carbon protective layer in an intermediate product having at least the magnetic layer and the carbon protective layer formed on a substrate surface, wherein the magnetic layer is partly removed to form the concavo-convex pattern by a dry etching method using an etching gas of a mixture gas of argon and a deposition gas of a hydrocarbon compound;

wherein the dry etching is concurrently performed on a principal surface of the magnetic layer and a principal surface of the carbon protective layer, and wherein the principal surface of the magnetic layer and the principal surface of the carbon protective layer are parallel to the substrate surface.

2. The method of forming a concavo-convex pattern according to claim 1, wherein the carbon hydrocarbon compound is methane.

3. A method of manufacturing a patterned medium comprising the steps of:

preparing an intermediate product of a medium having at least a magnetic layer and a diamond like carbon protective layer formed on a substrate surface; and forming a concavo-convex pattern by partially removing the diamond like carbon protective layer and the magnetic layer of the intermediate product of the medium using a mask having a predetermined pattern, the step of forming a concavo-convex pattern consisting of a sub-step of partially removing the diamond like carbon protective layer and a sub-step of partially removing the magnetic layer, wherein the sub-step of partially removing the magnetic layer is performed by a dry etching method using an etching gas of a mixture gas of argon and a deposition gas containing one or more types of carbon compounds;

wherein the dry etching is concurrently performed on a principal surface of the magnetic layer and a principal surface of the diamond like carbon protective layer, and wherein the principal surface of the magnetic layer and the principal surface of the diamond like carbon protective layer are parallel to the substrate surface.

4. The method of manufacturing a patterned medium according to claim 3, wherein the carbon compound is at least one of carbon compounds selected from a hydrocarbon compound, a carbon fluoride compound, and a fluorine-containing hydrocarbon compound.

5. The method of manufacturing a patterned medium according to claim 3, wherein the carbon compound is methane.

\* \* \* \* \*